June 2, 1931. K. E. PÜTTER 1,808,177
AIR PURIFYING APPLIANCE
Filed May 20, 1927
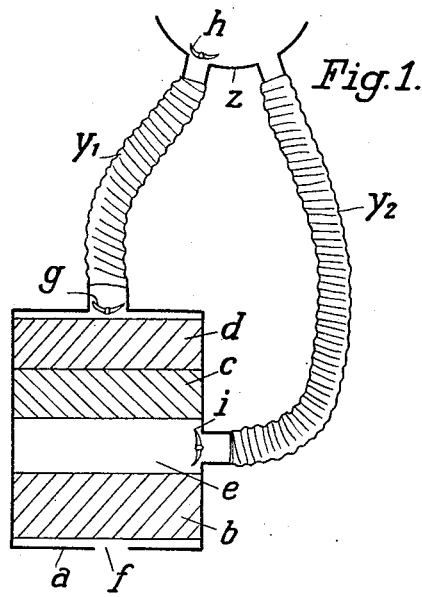
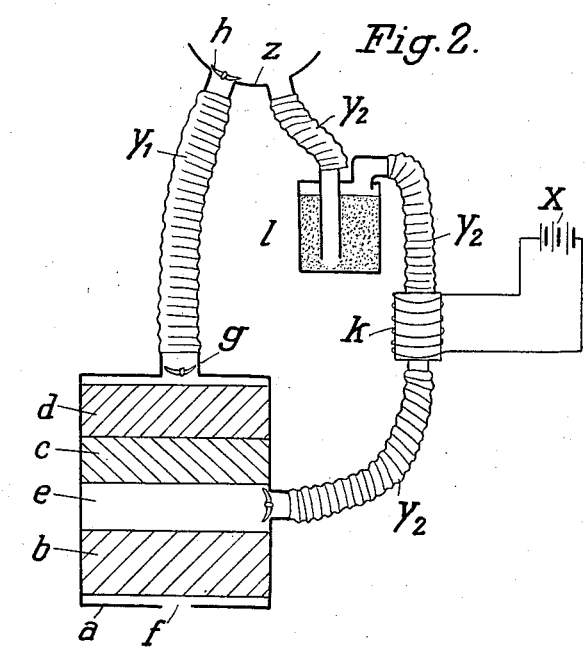
Inventor:
KARL EDUARD PÜTTER
By
Attorneys Patented June 2, 1931

1,808,177

UNITED STATES PATENT OFFICE

KARL EDUARD PÜTTER, OF BERLIN, GERMANY, ASSIGNOR TO DEUTSCHE GASGLÜH-LICHT-AUER-GESELLSCHAFT MIT BESCHRÄNKTER HAFTUNG, OF BERLIN, GERMANY, A CORPORATION OF GERMANY

AIR PURIFYING APPLIANCE

Application filed May 20, 1927, Serial No. 193,034, and in Germany May 20, 1926.

Two types are known in gas protection devices, in one of which the air exhaled is conducted through the filter over the same path as the breathing air (pendulum breathing), while in the other by the utilization of valves, only the breathing air is conducted through the filter, but the exhaled air is passed directly into the open air (valve controlled breathing). Both constructions show certain advantages and drawbacks.

With gas protection devices (breathing devices, gas or dust masks, or "respirators") operating according to the pendulum breathing type the advantage is attained that certain individual layers of the purifying substances are scavenged over again through the exhaled air passing through them. This is evident, for instance, with dust filtering devices, in which the particles of dust are torn off again to a large extent, and also with layers, acting physically, in which the particles of gas retained therein are again partially removed from the filtering masses in the same manner. Often an advantage is obtained with chemically acting filtering layers, for in this instance the filtering layers are rendered moist through the humid exhaled air, and thus in some cases a greater capability of reaction is obtained. Furthermore the passage of the exhaled air may sometimes effect a cooling in some cases in which the filtering layer is heated to a relatively high temperature by external influences or in the other case, for instance with low outside temperatures, it may cause a heating action and consequently an increase of the reactive power of the filtering material.

The main drawback of pendulum breathing lies in the fact that the entire air content of the air purifying element must be added to the dead space of the device, since it will be charged with exhausted air during breathing. In some instances the pendulum breathing cannot be made use of at all, since in such case frequently too voluminous filtering layers would be required if a high efficiency of protective action is called for. Another drawback is, that the total resistance of flow in the air purifying device must be overcome during exhaling by the bearer of the apparatus, for it is a known fact, that it is possible to overcome a greater resistance of flow under equal exertion during inhaling than during exhaling.

With valve-controlled gas protection devices these two drawbacks just mentioned are avoided, for here the exhaled air takes another passage than the breathing air, however, in the known valve-controlled gas protection devices the favorable action of the exhaled air mentioned above, on the efficiency of the filter in the air purifying element is not utilized.

According to the present invention the advantages of pendulum breathing are combined with those of valve-controlled breathing, in that breathing is controlled through valves, but the exhaled air is passed through the filtering layers, to improve their efficiency.

This favorable action can be increased in many instances, for instance in that the exhaled air is not utilized in the filter in its original state, but is subjected to a special preliminary or "conditioning" treatment (addition of certain substances, adjusting it to a predetermined content of moisture, controlling the temperature, and freeing it of carbonic acid or the like, wholly or partially.)

The unfavorable increase of the dead space of the protective device caused through the volume of the filtering element under pendulum action, can partially be avoided, by introducing in the positively valve-controlled portion of the filtering element, a layer binding or retaining the carbonic acid.

In contradistinction to sole pendulum breathing this can be carried through easily in this instance, for said layer is not consumed by the total amount of air exhaled, but only through the air remaining in the filtering element acting with pendulum breathing. If a larger dead space is to be coped with, the exhaustion of oxygen in the breathing air can be avoided by the provision of substances delivering oxygen. Furthermore, in some cases not all layers in which the passage of the exhaled air is desirable, will in fact be arranged in the path of the exhaled air, for the reasons stated above.

It is possible to construct the new device in various ways, and in the following some possibilities of construction are mentioned. For instance, it is possible to operate with two separate air passages up to filtering element operating according to the pendulum type, where through one of these passages the air is breathed in and through the other exhaled. The valves for drawing in the air and exhaling it can be arranged at the point of division of the air passages; this can be effected either on the filtering element proper, or on the mask or at intermediate points. In the path of the exhaled air at any desired point prior to its passage through the filtering element, operating according to the pendulum type, a suitable space may be provided, wherein the exhaled air is subjected to a preliminary treatment.

The filtering or air purifying element may also be so constructed, that the inlet and outlet valve and the chamber serving for preliminary treatment of the exhaled air constitute an integral member. On the other hand the individual filtering elements may be arranged separately and connected by means of intermediate members.

The breathing air, passing through all filtering layers prior to reaching the lungs of the wearer of the apparatus, can be conducted through the latter when entering it, in such a manner, that it will at first pass through the portion under pendulum action and then through the portion of the filtering element being valve-controlled, or also in a reverse manner. The breathing or inlet valve may be arranged either in front, between or behind the two parts of the said filtering element.

Several specific forms of the invention, conforming to the general description given above, are illustrated as examples by the accompanying drawing, in which each of Figs. 1 and 2 is an elevation, with parts in section, of two different forms of my invention.

In each of said forms, $a$ is the casing or housing of the filter, shown as provided with three layers $b$, $c$, $d$ of filtering material, the layers $c$, $d$ being contiguous and spaced by a chamber or compartment $e$ from the layer $b$, which latter is arranged adjacent to the port or opening $f$ serving alternately as an inlet for the air inhaled and as an outlet for the air exhaled. At $g$ I have indicated a valve controlling an outlet from the casing $a$, on the side of the layer $d$ opposite to the layer $c$, which outlet leads to the inhaling tube $Y_1$, the connection of which with the mask proper Z is controlled by the suction valve $h$. $Y_2$ designates the exhaling tube leading from the mask Z to the compartment $e$, the said tube being controlled by the exhaling or delivery valve $i$.

In Fig. 1, the exhaling tube $Y_2$ is continuous from the mask Z to the compartment $e$ of the casing $a$. During breathing, air inhaled by the wearer of the mask will enter through the opening $f$ and pass through the layer $b$ into the compartment $e$, and, since the suction in pipe $Y_2$ produced by inhaling closes the valve $i$, the air will pass from said compartment $e$ through the inhaling tube $Y_1$ into the mask Z, the valves $g$ and $h$ opening in response to the suction produced by inhaling. As the wearer exhales air, such air will pass from the mask Z through the tube $Y_2$ into the compartment $e$, the valve $i$ opening automatically to permit such passage. The pressure produced by exhaling has closed the valve $h$, and thus the exhaled air reaching the compartment $e$ through the tube $Y_2$ can escape only through the layer $b$, thus reaching the port or opening $f$ which at that time performs the function of an outlet. It is well-known that exhaled air contains carbonic acid and moisture. A pulsating action takes place in the layer $b$, since the air passes through such layer alternately in opposite directions, during inhalation and exhalation respectively. The passage of air through said layer during exhalation will improve the efficiency of said layer. For instance, if the layer $b$ consists of an adsorbing material, such as activated carbon, which during inhalation retains dust or other impurities contained in the air, the passage of air through said layer in the reverse direction during exhalation will loosen some of the impurities retained and blow them out.

This cleaning or purifying action of the exhaled air upon the material of the layer $b$ may be improved considerably by "tempering" such air, that is, adjusting it to a temperature at which it will exert said purifying action most efficiently. This temperature adjustment may be effected, for instance, by means such as indicated in Fig. 2, where the exhaling tube $Y_2$ consists of two sections with an interposed heater, here exemplified as an electric heating coil $k$ supplied with heating current from a battery X.

The layer $b$ may also consist of a substance, such as an alkali or a mass of soda and lime, which is more efficient when in a moist condition. Such alkaline layer will receive a new supply of moisture with every breath exhaled. It may be desirable to supply to the layer $b$ an amount of moisture greater than the one it receives from the air exhaled; in this case, I may interpose, between the two sections of the exhaling tube $Y_2$, a "conditioning" or moisture-adjusting apparatus, which in this particular case would be a humidifier. Such apparatus, indicated at $l$ in Fig. 2, may consist of a casing containing water, either as a continuous body of liquid, or carried by a porous absorbent material. Since masses consisting of alkali or of soda and lime are very sensitive to carbonic acid, the apparatus $l$ might, when the layer $b$ consists of masses of this character, serve the useful purpose of absorbing carbonic acid and thus preventing the injurious action of such acid on the layer $b$, in addition to acting as a humidifier. In some cases, however, the layer $b$ may consist of substances (for instance activated carbon, or silica gel) which are purified more efficiently by dry air than by moist air; in such cases, the moisture-controlling apparatus $l$ would contain, not a moisture-imparting substance, but a drying or hygroscopic substance, for instance calcium chloride.

In some cases, it may be desirable to control or adjust both the temperature and the degree of moisture of the exhaled air passing to the chamber or compartment $e$. In such cases, I may employ an apparatus of the kind illustrated by Fig. 2, in which the aforesaid temperature-controlling apparatus $k$ is combined with the previously mentioned moisture-controlling apparatus $l$. If control or adjustment of the temperature and/or the degree of moisture of the aforesaid exhaled air is not desired, then the heating coil $k$ and its battery X, and the apparatus $b$, or either of them may be omitted.

An important advantage of the arrangements according to the present invention consists in that no great requirements may be called for as regards the tightness of the outlet valve.

I claim:

1. A respirator having an opening adapted to serve alternately as an inlet and as an outlet, a chamber arranged to receive both the air to be inhaled and the exhaled air, a purifying chamber interposed between said receiving chamber and said opening, a mask, a conduit to lead the exhaled air from said mask to said receiving chamber, a connection, separate from said conduit, for leading air for inhalation from said receiving chamber to said mask, and an air-purifying element in said connection.

2. A respirator having a plurality of filtering layers, a mask with an inlet connection to receive air which has passed through all of said layers, and an outlet connection leading from said mask to a point between two of said filtering layers, to cause the exhaled air to pass only through a portion of the filtering layers.

3. The method of rendering foul air suitable for breathing, which consists in passing exhaled air in contact with a purifying substance capable of being regenerated thereby, and passing the air to be inhaled in contact with said purifying substance after it has been in contact with the exhaled air, and passing such inhalation air in contact with a purifying substance that has not been in any substantial contact with said exhaled air.

4. In an air purifying appliance, the combination of a container, a plurality of filtering layers located in said container in separated relation and at least one of which is capable of being regenerated by exhaled air, a mask, and valve controlled conduits connecting said mask with said container in a predetermined manner to pass inhaled air through all of said layers to said mask, and to pass exhaled air from said mask through only such layers as will be regenerated thereby.

In testimony whereof I affix my signature.

KARL EDUARD PÜTTER.